June 18, 1963   A. L. STAUFFER   3,094,302
WIRE SCREEN SEALING SYSTEM
Filed Oct. 28, 1959

INVENTOR.
ARTHUR L. STAUFFER
BY
ATTORNEY

United States Patent Office 3,094,302
Patented June 18, 1963

3,094,302
WIRE SCREEN SEALING SYSTEM
Arthur L. Stauffer, Hanover, Pa., assignor to Continental Copper & Steel Industries, Inc. (Hanover Wire Cloth Division), New York, N.Y., a corporation of Delaware
Filed Oct. 28, 1959, Ser. No. 849,205
5 Claims. (Cl. 245—10)

The present invention relates to a wire screen sealing system, and it particularly relates to a system for sealing wire screening so as to prevent unraveling thereof when small sections or strips are cut therefrom, less than the full width of the woven cloth.

It is among the objects of the present invention to provide a wire cloth arrangement in which it is possible to cut sections either warpwise or filler or weftwise with assurance that there will not be any unraveling at the edges of the wire cloth.

Another object of the present invention is to provide a novel woven wire construction which will permit cutting of the fine wire while at the same time giving better assurance against unraveling of the wire where the cutting or line of cleavage is between the selvage edges or transverse to the warp.

Still further objects and advantages will appear in the more detailed description set forth below, it being understood, however, that this more detailed description is given by way of illustration and explanation only and not by way of limitation, since various changes therein may be made by those skilled in the art without departing from the scope and spirit of the present invention.

In accomplishing the above objects, it has been found most satisfactory according to one embodiment of the present invention to apply a plastic strip of material which may be an organic polymer or a plastic metallic material, in which the portions of the warp and the weft adjacent the cutting line are substantially and completely imbedded in the plastic material.

The cutting may be carried out so as to cut out one weft wire, or desirably the cut may be between spaced weft or even filler wires with each side of the space being sealed by means of lines of imbedding plastic material.

Desirably, a thermo-plastic material is utilized, and it may be applied as a strip following which a hot roller is utilized to melt, soften or press the thermo-plastic material into the mesh and to encircle and seal the wire strains.

Where a liquid solder or sealing material is employed, the liquid solder is preferably applied lengthwise or weftwise of the woven material.

Desirably, the plastic material extends between one or two weft wires, although it may also extend between one or two filler wires if the cut is the other way.

It has been found desirable to apply the plastic strip and then cut after the plastic strip has been applied so that the separated mesh will hold its position at the cut edge of the fabric without distortion and modification due to the force of the cutting tool.

The plastic material will also serve as a cutting guide and will aid in both manual cutting with a shear and in high speed cutting with a roller.

Although the dimensions and thickness may widely vary, the mesh may be flattened at the point of application of the plastic material so that it will have a lesser thickness than the balance of the wire screening, and so that the portion to which the plastic is applied is slightly flattened or widened.

Although the dimensions may vary considerably, it has been found that the dimensions should not greatly exceed the thickness of the wire screen at the point of application of the plastic, and the thickness should be in the order of 0.020″ to 0.028″.

In the less preferred embodiment of the present invention, the wire screen may be cut and then each edge may be adhesively sealed by a strip of plastic or liquid solder.

The plastic material is desirably a vinyl polymer or an acrylic polymer.

Where a metal material is employed, a liquid aluminum solder is preferably applied to the edge of the wire screening.

The preferred form of liquid solder is a flake aluminum paint in which the flakes will be caused to seal and lie upon a wire screening edge.

With the foregoing and other objects in view, the invention consists of the novel construction, combination and arrangement of parts as hereinafter more specifically described and illustrated in the accompanying drawings, wherein is shown an embodiment of the invention, but it is to be understood that changes, variations and modifications can be resorted to which fall within the scope of the claims hereunto appended.

In the drawings wherein like reference characters denote corresponding parts throughout the several views.

Referring to FIGS. 1, 2, 5 and 6, the weft of the wire screening A may be considered as extending in the direction of the double headed arrow 10, while the warp may be considered as extending in the direction of the double headed arrow 11.

Figure 2:
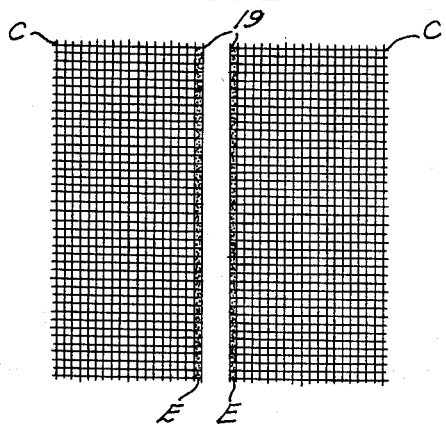
FIG. 2, shows the cut sections.
Figure 4:
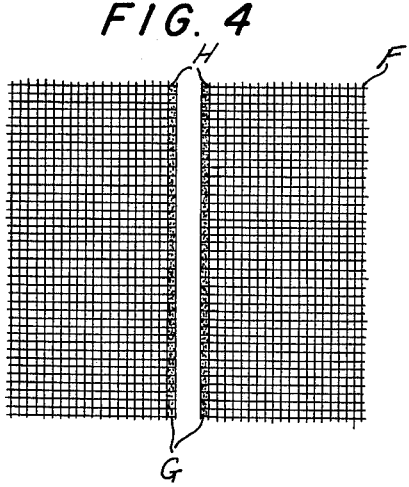
FIG. 4 shows the manner of applying a plastic seal to the edges thereof.

This work may be reversed where the cut is to be made weftwise instead of warpwise as in FIG. 2.

Figure 5:
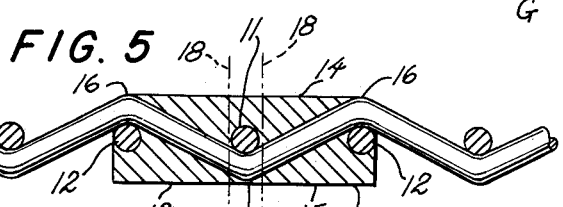
FIG. 5 is a transverse sectional view upon the line 5—5 of FIG. 1.
Figure 6:
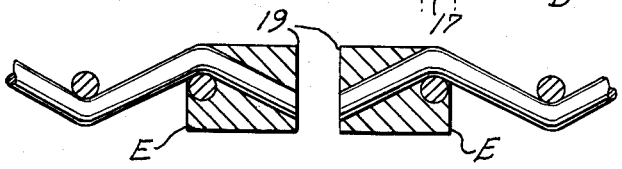
FIG. 6 is a transverse sectional view similar to FIG. 5 showing the application of the cut thereto.

As shown in FIG. 5, there is a central warp wire 11 with side warp wires 12 between which extends the thermo-plastic material 13.

It will be noted that the top surface 14 and the bottom surface 15 do not extend beyond the top face 16 or the bottom face 17 of the screening, and that at the portion of the cut indicated by the dot and dash lines 18, the warp and weft wires are both substantially completely encased in the plastic strip B.

This thermo-plastic material B may be applied as a strip to one side, and it is then pressed into the screening by means of a hot roller, or it may be applied in liquid form or in the form of a solidified paint carrying aluminum powder or aluminum flakes.

Although the top and bottom surfaces 14 and 15 are shown flat in FIG. 5, they, of course, may be concaved inwardly to more closely conform to the contour of the wire screening with the bumps or elevations being locked at the outer edge of the filler and having the thinness layer of plastic or adhesive material thereon.

As shown, the cut line 18 will cut directly through and take out a warp wire 11, but if desired, the warp wire 11 may be omitted so that there is an extra spacing between the warp wires 12, and the cut then may be directly between the warp wires 12.

As a result of cutting the single sheet A to two sheets C with cut plastic portions E, two new surface edges 19 will be formed each protected by a plastic strip of material.

This application of plastic material at E on the cut edge of the separate piece C will hold the mesh in position and prevent it from dislodgment and also prevent loose wires forming at the cut edges.

If desired, two strips of plastic material B might be applied to the screening A with a spacing there between so that the cutting shears or cutting roller might be used to cut between the two strips of plastic, in which case, ends of the weft would project inwardly of each of the plastic sealing edges.

Desirably, however, the seal should carry the cut edge so that such projecting weft or filler wires will be coated and covered by the plastic material.

Figure 1:
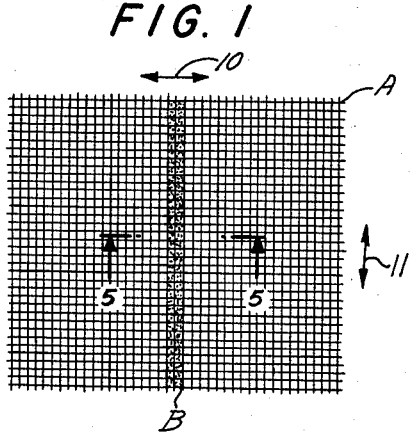
FIG. 1 is a top plan view of a section of screening showing a sealing plastic or metal strip applied thereto.
Figure 3:
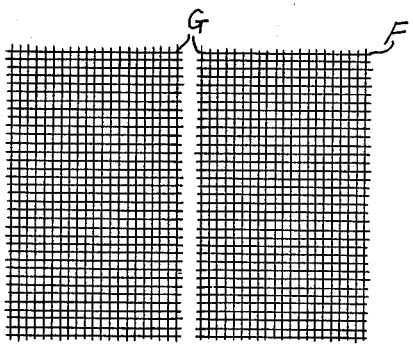
FIG. 3 is a top plan view showing two sections of screening which have been cut apart.

In the embodiment of FIG. 3, the screening F is first cut to give the two cut edges G, then the plastic material is applied at H to the cut edges G sealing such cut edges.

This may be done by running the cut edges through a liquid bath or by applying or folding over a strip of plastic material to the cut edge.

Where cutting is done, it is desirable to use a hot edge tool.

Where the wire has a thickness ranging from 0.0105" to 0.0128", the plastic material may increase this thickness to between 0.018" to 0.028", and desirably, the plastic is pressed down with a hot roller so that it does not exceed this thickness.

If desired, the selvage wires 12 on each side of the cut as shown in FIG. 5, may be doubled or tripled by being placed in one reed eye, and the cut and plastic material may be applied between the doubled or tripled weft wires.

By this type of operation, it is possible to prepare a wire screening which will not readily unravel and which will have a smooth edge.

The application of the plastic edging will prevent displacement or dislodgment of the wire mesh and will assure a more satisfactory screening arrangement.

As many changes could be made in the above wire screen sealing system, and many widely different embodiments of this invention could be made without departing from the scope of the claims, it is intended that all matter contained in the above description shall be interpreted as illustrative and not in a limiting sense.

Having now particularly described and ascertained the nature of the invention, and in what manner the same is to be performed, what is claimed is:

1. A wire screen comprising a plurality of spaced warp wires and a plurality of spaced sinuous weft wires interlocked with said plurality of warp wires, said plurality of warp wires including at least one central warp wire and two side warp wires, one of said side warp wires being adjacent to, and spaced on either side of, said central warp wire, said plurality of weft wires having upwardly and downwardly bowed portions extending over and under said central and side warp wires, each of said upwardly and downwardly bowed portions having a crest, a strip of thermoplastic material encasing said central and side warp wires and said upwardly and downwardly bowed portions of said plurality of weft wires, said strip of thermoplastic material being substantially rectangular in cross-section and having a top and a bottom face, said top and bottom faces being coincident with said crests of said upwardly and downwardly bowed portions.

2. A wire screen in accordance with claim 1 wherein said strip of thermoplastic material consists of a liquid solder composed of a mixture of paint-like material and powdered metal.

3. A wire screen comprising a plurality of spaced warp wires and a plurality of spaced sinuous weft wires interlocked with said plurality of warp wires, said screen having two warpwise edges and two weftwise edges and said plurality of warp wires including at least one warp wire extending along one warpwise edge and spaced inwardly therefrom, said plurality of weft wires having upwardly and downwardly bowed portions extending over and under said plurality of warp wires, each of said upwardly and downwardly bowed portions having a crest, each of said plurality of weft wires having an edge portion interlocked with said one warp wire and an end coincident with said one warpwise edge, a strip of thermoplastic material encasing said one warp wire and said edge portion of each of said plurality of weft wires, said thermoplastic strip being substantially rectangular in cross-section and having a top and a bottom face and at least one end face, said top and bottom faces being coincident with said crests of said upwardly and downwardly bowed portions and said end face being coincident with said one warpwise edge.

4. A wire screen in accordance with claim 3 wherein said strip of thermoplastic material consists of a liquid solder composed of a mixture of paint-like material and powdered metal.

5. A method of cutting and sealing a wire screen having a plurality of spaced warp wires and a plurality of spaced sinuous weft wires interlocked with said plurality of warp wires, said plurality of warp wires including at least one central warp wire and two side warp wires, one of said side warp wires being adjacent to, and spaced on either side of, said central warp wire, said plurality of weft wires having upwardly and downwardly bowed portions extending over and under said central and side warp wires, each of said upwardly and downwardly bowed portions having a crest, comprising placing a strip of thermoplastic material having a top and bottom face over said central and side warp wires and said upwardly and downwardly bowed portions of said plurality of weft wires, pressing said thermoplastic strip into said screening to encase said central and side warp wires and said upwardly and downwardly bowed portions of said plurality of weft wires, said pressing being such that said top and bottom face of said thermoplastic strip is rendered coincident with said crests of said upwardly and downwardly bowed portions of said plurality of weft wires, and cutting said wire screen through said central warp wire into two screens each having an edge portion encased in a portion of said thermoplastic strip.

References Cited in the file of this patent

UNITED STATES PATENTS

| | | |
|---|---|---|
| 265,302 | Brigham | Oct. 3, 1882 |
| 307,091 | Brigham | Oct. 28, 1884 |
| 410,250 | Midgley | Sept. 3, 1889 |
| 2,211,081 | Sinclair | Aug. 13, 1940 |
| 2,659,958 | Johnson | Nov. 24, 1953 |
| 2,682,097 | Wade | June 29, 1954 |

FOREIGN PATENTS

| | | |
|---|---|---|
| 1,057,278 | France | Oct. 28, 1953 |
| 714,479 | Great Britain | Aug. 25, 1954 |